United States Patent [19]

Leonard

[11] 4,220,535
[45] Sep. 2, 1980

[54] MULTI-ZONED HOLLOW FIBER PERMEATOR

[75] Inventor: Richard L. Leonard, Decatur, Ala.

[73] Assignee: Monsanto Company, St. Louis, Mo.

[21] Appl. No.: 931,049

[22] Filed: Aug. 4, 1978

[51] Int. Cl.² ............................................. B01D 31/00
[52] U.S. Cl. .............................. 210/321 R; 210/456; 55/158
[58] Field of Search ............... 210/256, 257 M, 295, 210/321 B, 321 A, 433 M, 456, 323 T

[56] References Cited

U.S. PATENT DOCUMENTS

| | | | |
|---|---|---|---|
| 2,049,748 | 8/1936 | Rathbun | 257/239 |
| 2,961,062 | 11/1960 | Hunter et al. | 55/158 |
| 3,019,853 | 2/1962 | Kohman et al. | 55/158 |
| 3,526,001 | 8/1970 | Smith | 210/23 |
| 3,536,611 | 10/1970 | De Filippi et al. | 210/22 |
| 3,704,223 | 11/1972 | Dietzsch et al. | 210/321 B |
| 3,755,034 | 8/1973 | Mahon et al. | 156/169 |

FOREIGN PATENT DOCUMENTS

| | | | |
|---|---|---|---|
| 2744855 | 4/1978 | Fed. Rep. of Germany | 210/321 B |
| 1445549 | 6/1966 | France | 210/321 |
| 50-12395 | 5/1975 | Japan | 210/321 R |

OTHER PUBLICATIONS

"Optimal Design of Hollow Fiber Modules," Doshi et al., Aiche Journal, vol. 23, No. 5, Sep. 1977, pp. 765–768.

Primary Examiner—Charles N. Hart
Assistant Examiner—David R. Sadowski
Attorney, Agent, or Firm—Norman L. Balmer; Howard C. Stanley; James W. Williams, Jr.

[57] ABSTRACT

Transversely-fed permeators containing a plurality of selectively permeable hollow fibers suitable for the selective permeation of at least one fluid in a fluid mixture containing at least one other fluid, said fibers being generally parallelly oriented within an elongated shell, are provided with at least one essentially fluid impermeable partition which is substantially transverse to the orientation of the hollow fibers and intermediate a fluid ingress means and a fluid egress means, each of said fluid ingress means and fluid egress means communicating through the elongated shell to the exterior of the hollow fibers, said at least one partition defining zones in said permeator, wherein the zone into which the fluid ingress means communicates is significantly smaller in available membrane surface area to effect the fluid separation than the available membrane surface area in at least one subsequent zone, and means for fluid communication between said zones such that the fluid flow in each zone is substantially transverse to the orientation of the hollow fibers.

15 Claims, 2 Drawing Figures

MULTI-ZONED HOLLOW FIBER PERMEATOR

This invention pertains to apparatus for separating at least one fluid from a fluid feed mixture containing at least one other fluid by selective permeation of the at least one fluid through membranes.

The use of membranes for separating at least one fluid from a fluid fluid mixture containing at least one other fluid has long been suggested. In these membrane separations, permeable fluids in the fluid feed mixture pass, under the influence of a differential in chemical potential, e.g., a driving force such as provided by a differential in concentration, partial pressure, total pressure, etc. (depending on the nature of the membrane and separation operation), from a feed side of the membrane to a permeate side of the membrane. The fluid may pass through the membrane by interaction with the material of the membrane or by flow in interstices or pores (fluid flow channels) present in the membrane. Typical separations effected by membranes include gas-gas, gas-liquid, and liquid-liquid (which can encompass liquid-dissolved solid separations.

The viability of the use of membranes for fluid separations as compared to other separation procedures such as absorption, adsorption, distillation, and liquifaction often depends on the cost of the apparatus and its operation including energy consumption, the degree of selectivity of separation which is desired, the total pressure losses caused by the apparatus for conducting the separation procedure which can be tolerated, the useful life of such apparatus, and the size and ease of use of such apparatus. Film membranes may frequently not be as attractive as other separation apparatus due to the need for film membranes to be supported to withstand operating conditions and the overall complexity of apparatus containing film membranes. Membranes in the configuration of hollow fibers, or hollow filaments, may overcome some of the deficiencies of film membranes for many separation operations in that the hollow fibers are generally self-supporting, even under operating conditions, and provide a greater amount of membrane surface area per unit volume of separation apparatus than that which is provided by film membranes. Thus, separation apparatus containing hollow fibers may be attractive from the standpoint of convenience, in size and reduced complexity of design.

There are medical and industrial separations in which a substantial reduction in at least one fluid from a fluid mixture is required. Examples of such separations are the removal of impurities and waste products from blool streams and the removal of contaminants from industrial streams including waste streams. A typical separation operation which may be required in industrial processes is the separation of phenol from aqueous solutions of phenol. Phenol is present in many industrial effluents, and its discharge to the environment represents not only an economic loss but also a potential environmental hazard. Accordingly, it is highly desired to reduce the concentration of phenol in such industrial effluents to substantially non-deleterious levels. For instance, phenol may be present in the industrial effluent at concentrations of about 2 or more weight percent, and generally it is desired to reduce the phenol content of the industrial effluent to less than about 200, or even less than about 50, parts per million by weight (ppmw) in order to maintain the quality of the environment and to prevent the undue loss of chemically valuable phenol. It is desired to provide apparatus utilizing membranes to effect fluid separations in which a substantial reduction of at least one fluid in a fluid mixture can be achieved.

Separation operations utilizing selective membrane permeation, which operations must achieve a substantial reduction in the concentration of the at least one fluid in a fluid mixture, may involve significant difficulties. For example, a low chemical potential of the at least one fluid needs to be provided on the permeate side of the membrane such that the desired low concentrations of the at least one fluid can be obtained on the feed side of the membrane and such that high fluxes (i.e., rates of permeation) of the at least one fluid per unit of membrane surface area can be obtained such that unduly large apparatus, which may be economically unattractive, are not required. Frequently, in these separations a high volume of a sweep fluid is passed on the permeate side of the membrane in order to maintain the concentration of the permeate in the sweep fluid low in order to provide the desired flux (i.e., rate of permeation) and amount of permeation of the at least one fluid through the membrane. Other types of separation operations in which the chemical potential differential across the wall of the membrane is high include separation operations in which the at least one fluid, which permeates the membrane, is reacted on the permeate side of the membrane, e.g., to a non-permeating moiety such that the chemical potential of the at least one fluid on the permeate side of the membrane is substantially zero. In view of these difficulties, it is apparent that the design of the membrane separation apparatus may play a significant role in determining the viability of membranes to effect the separations.

An approach which has been proposed for the fabrication of apparatus for fluid separations employs a plurality of hollow fiber membranes generally parallelly arranged in an elongated bundle positioned in a tubular shell. These apparatus include transversely-fed permeators, including radially-fed permeators, wherein fluid at the exterior of the hollow fibers primarily passes through the permeator transverse to the predominant longitudinal orientation of the hollow fibers. In many instances, transversely-fed permeators can provide a desirable distribution of fluid at the exterior of the hollow fibers which enables obtaining advantageous efficiencies in operation since substantially all of the available membrane surface area in the permeator can be effectively utilized. Transversely-fed permeators can be provided with partitions in order to provide fluid flow sequencing between the zones defined by the partition. The fluid flow sequencing can be countercurrent or cocurrent to the flow through the bores of the hollow fibers. For instance, a countercurrent operation can achieve high permeate purities and high permeate fluxes for a permeator of a given membrane surface area.

In separation operations such as described above wherein a substantial reduction of the at least one fluid in a fluid mixture is achieved by selective permeation using a transversely-fed permeator, unique problems have been found to occur. For instance, a substantially greater flux of the at least one fluid may occur in the regions of available membrane surface area first contacted by the fluid feed mixture than that in the regions last contacted by the fluid feed mixture. By way of an example, in a separation operation which serves to reduce the at least one fluid content of the fluid feed mixture from, say, one volume percent to 0.01 volume percent, approximately 90 percent of the permeation can occur in the first one half of the available membrane surface area. In order to handle this greater flux in the initial regions of the membrane surface area and maintain the desired low chemical potential of the at least one fluid on the permeate side of the membrane, it is necessary to, for instance, provide proportionately greater amounts of a sweep fluid or reactant (in the case of reactive dialysis) to these initial regions. These difficulties can easily be perceived by reference to a reactive dialysis operation to separate phenol from aqueous phenol-containing industrial effluents. In the reactive dialysis operation the phenol concentration on the exit side of the membrane is maintained at an essentially zero level by chemically converting the permeating phenol to a non-permeating moiety. Conveniently, a caustic-containing stream is used to immediately convert the permeating phenol to substantially non-permeable sodium phenate which can then be used in other chemical processes and thus represents a conservation in valuable chemical materials. Thus, for instance, if the phenol content of the aqueous phenol solution is reduced from 1 to 0.01 weight percent, the initial hollow fibers contacted by the aqueous phenol solution would theoretically require 100 times more caustic than that membrane region exposed to the phenol-depleted stream. Accordingly, these difficulties can cause significant problems in the design and efficiency of transversely-fed permeators.

One solution to these problems can involve providing a transversely-fed permeator in which the initial hollow fibers contacted by the feed mixture have larger diameters such that an increased flow of sweep fluid or reactant per unit of membrane surface area can be achieved. The diameters of substantially contacted hollow fiber membranes can then be decreased since lesser amounts of sweep fluid or reactant need pass therethrough. Utilizing smaller diameter hollow fibers is advantageous in that a greater amount of membrane surface area can be provided per unit of permeator, thereby reducing the overall size of the permeator. This design, of course, would greatly complicate permeator assembly and would necessitate the preparation of various diameter hollow fibers. Another design possibility for hollow fiber permeators includes the use of progressively longer hollow fiber lengths as the concentration of the at least one fluid in the fluid mixture decreases such that less available membrane area is provided in the initial regions contacted. Similarly, the permeator assembly procedure would be expected to be quite complex and expensive.

Accordingly, transversely-fed permeators employing hollow fiber membranes which permeators can handle the vast differences in the required sweep fluid or reactant flows on the permeate side of the membrane are sought. Furthermore, it is desired that these advantages be obtained without undue complexity or expense in the fabrication of the permeators.

In accordance with this invention, a transversely-fed permeator containing hollow fiber membranes for separating at least one fluid (permeating fluid) from a fluid feed mixture containing at least one other fluid (retentate fluid) by selective permeation of the at least one fluid through the membranes, exhibits highly desirable efficiencies of operation while obtaining desirable recoveries of the permeated at least one fluid. The transversely-fed permeator of this invention is particularly advantageous in separation operations in which the chemical potential of the at least one fluid in the fluid feed mixture is greatly reduced during a separation operation, e.g., frequently at least a five, preferably at least a ten, fold reduction, and the chemical potential of the at least one fluid on the permeate side of the membrane is sufficiently low such that the significant reduction in the at least one fluid can be achieved on an attractive basis. Thus, the transversely-fed permeators of this invention are particularly useful in dialysis, especially reactive dialysis and blood dialysis.

The transversely-fed permeator of this invention comprises an elongated, fluid impervious shell having at least one end adapted to receive a tube sheet; a plurality of selectively permeable hollow fibers having an exterior surface (shell side) and a bore and being generally parallely positioned within the shell to form an elongated bundle of hollow fibers; at least one tube sheet in fluid tight relationship within said shell wherein at least one end of each of said hollow fibers is embedded in a fluid tight relationship in said at least one tube sheet and wherein the bores of said hollow fibers communicate through said tube sheet; at least one essentially fluid impermeable partition in said shell transverse to the longitudinal orientation of the hollow fibers to provide zones in said shell, there being provided an initial zone and at least one subsequent zone; means to enable fluid flow between adjacent zones wherein said means and said partition are adapted to provide the fluid flow in each of said zones which is primarily substantially transverse to the orientation of the hollow fibers in the zone; fluid ingress means adapted to provide fluid flow into said shell to the exterior of said hollow fibers in said initial zone; longitudinally distant fluid egress means adapted to provide fluid flow from the exterior of said hollow fibers out of said shell wherein said initial zone is significantly smaller in available membrane surface area to effect said fluid separation than the available membrane surface area in an at least one subsequent zone. Preferably, the bore side of the hollow fibers is the permeate side of the membrane.

Since the initial zone of a permeator of this invention contains only a small portion of the available membrane surface area in the permeator, the amount of said at least one fluid which permeates the membranes can be more evenly distributed among the hollow fibers of the permeator. Consequently, the flow of fluids through the permeator can be relatively uniform among the hollow fibers. Moreover, since the fluid flow in each zone is substantially transverse to the orientation of the hollow fibers, a good dispersion of fluid at the exterior of the hollow fibers can be obtained which can provide desirable efficiencies of operation. Due to the presence of the zones the benefits of cocurrent or countercurrent operations can be achieved in the transversely-fed permeators of this invention. Another advantage provided by the transversely-fed permeators of this invention is that the fluid which has been passed through the shell-side of the bundle in one zone can be commingled such that the fluid passing to the subsequent adjacent zone is relatively uniform in the chemical potential of the at least one fluid. Accordingly, the effect of any significant non-uniformity in chemical potential of the at least one fluid in the fluid on the shell side of the bundle can be minimized. Such non-uniformity in the chemical potential of the at least one fluid on the shell side of the bundle may occur due to the formation of fluid by-pass channels in a zone or longitudinal gradients in the chemical potential of the at least one fluid across the membrane wall over the length of the hollow fibers in the zone.

In the permeators of this invention the initial zone of the permeator is significantly smaller in available membrane surface area than the available membrane surface area in an at least one subsequent zone. Often, the initial zone contains less than about 90, sometimes less than about 80, percent of the available membrane surface area which is contained in an at least one subsequent zone. Preferably, the initial zone in the permeator contains less than about 40 percent of the total available membrane surface area for effecting the separation in the permeator. Generally, in permeators in which a greater reduction of the concentration of the at least one fluid in the fluid feed mixture is desired, the initial zone advantageously contains a lesser portion of the total available membrane surface area to obtain that reduction in the permeator. For instance, if a one-hundred-fold reduction in the concentration of the at least one fluid is sought, the initial zone may contain less than about one-third of the available membrane surface area in the permeator. In most instances, however, the initial zone contains at least about 10, say, at least about 15, percent of the total available membrane surface area. At least one subsequent zone in the permeator is significantly larger in total available membrane surface area than the surface area contained in the initial zone. In the case of permeators having only two zones, the second zone, of course, comprises the remainder of the available membrane surface area of the permeator. In permeators in which more than two zones are employed, frequently the available membrane surface area in the subsequent zones may be at least about 0.8, e.g., range from about 0.9 or 1 to about 5 or more times, the available membrane surface area provided in the initial zone. Usually the second zone of the permeator, i.e., the zone immediately following the initial zone, is significantly larger than the initial zone. Often, the ratio of available membrane surface area provided in the second zone to that of the initial zone is at least about 1:1:1, say, about 1.25:1 to 5:1.

In an advantageous embodiment of the invention, the relative amounts of available membrane surface area provided in each of the initial and subsequent zones of the permeator are such that the amount of the at least one fluid permeating through the walls of the hollow fibers is substantially uniform among the hollow fibers. Thus, for example, the amount of sweep fluid or reactant required on a theoretical basis to be passed through the bore of each hollow fiber membrane in a separation operation employing a transversely-fed permeator of this invention is substantially the same, i.e., the amount of or the at least one fluid which permeates does not vary by, say, more than about 100 percent between the hollow fibers (assuming the hollow fibers are fully functional with good fluid dispersion). Optimal zone sizes can be approximated by calculating the surface area required in each zone such that the total amount of the at least one fluid permeating from all zones into the first hollow fibers, i.e., those hollow fibers which when they extend into the initial zone, are first contacted by the fluid feed mixture, is substantially equivalent to the total amount of the at least one fluid permeating from all zones into the last hollow fibers, i.e., those hollow fibers which when they extend into the initial zone are last contacted by the fluid feed mixture. Thus, for a given reduction of concentration of the at least one fluid in two zone permeator, the fluxes of the at least one fluid through a hollow fiber which is first contacted by the fluid feed mixture (i.e., the flux through that hollow fiber in the initial and second zones) is set equal to the fluxes of the at least one fluid through a hollow fiber which is last contacted by the fluid feed mixture in the initial zone (i.e., the flux through that fiber in the initial and second zones) and the required area of the fibers in each zone are calculated.

The optimal zone sizes can be calculated on a strict basis. In such calculations the flux of the at least one fluid through a membrane can be determined using conventional calculations based on the permeability of the at least one fluid through the membrane, the differential in chemical potential for the at least one fluid across the membrane, and the available membrane surface area. An efficiency factor may also be employed to compensate for expected decreases in efficiency due to, e.g., non-ideal flow patterns in the permeator, fouling of the membrane surface, and the like. However, since in most separation operations employing the transversely-fed permeators of this invention the chemical potential of the at least one fluid on the permeate side is relatively low (e.g., often less than about 10 percent of the chemical potential of the at least one fluid on the feed side of the membrane at that position in the permeator), the required area in each zone can be approximated from the equations:

$$\Sigma(C_i)_n x_n A = \Sigma(C_f)_n x_n A$$

wherein for each zone n, R (a mathematical function) is set equal for each zone and is $$R = \frac{\ln(C_{in})_n - \ln(C_{out})_n}{x_n A}$$

wherein C is the chemical potential, e.g., concentration, partial pressure, or the like, of the at least one fluid, i designates the hollow fiber which is first contacted by the fluid feed mixture in the initial zone, f designates the last hollow fiber in the initial zone, n is the zone, $x_n A$ is the portion of the total available membrane surface area in zone n, and $(C_{in})_n$ and $(C_{out})_n$ are the chemical potentials to and from zone n. In accordance with an aspect of this invention the portion of the total available surface area required for the desired separation in the initial zone is within about 20, preferably 10, percent of the above calculated surface area, and the proportion in the second zone is at least about 80, preferably about 90 to 500 percent of the above calculated surface area.

At least one partition may be employed in permeators of this invention. In view of the expense in the fabrication of a partition and the often reduced incremental increase in permeation of the at least one fluid and in uniformity of mass transfer which can be obtained with each additional partition as well as the increase in fluid pressure drop which is encountered in each transverse pass of the hollow fiber bundle, economic considerations frequently play a role in the determination of the number of partitions to be employed. Accordingly, for many separation operations it is preferred to employ from 1 to about 4 partitions in the permeator, i.e., the permeator has 2 to about 5 zones.

In another aspect of the invention, in permeators having 3 or more zones, the partitions can be symmetrical without undue loss of permeator efficiency. Since the partitions are symmetrically placed within the permeator, it is thus possible to reverse the function of the fluid ingress means and fluid egress means without deleteriously affecting the performance of the permeator.

The partitions may be of any suitable design and are positioned in the shell such that the flow of fluid in a zone is transverse to the orientation of the hollow fibers. Most frequently, the partitions extend in at an angle of at least 45°, preferably, at least about 75°, from the longitudinal orientation of the hollow fibers. Conveniently, the partitions are generally perpendicular to the longitudinal orientation of the hollow fibers. The partitions may be comprised essentially of fluid impervious material. The hollow fibers pass through the partition, i.e., with the bores of the hollow fibers substantially unobstructed. Often, substantially all, e.g., at least about 70 or 80 percent, preferably all, of the hollow fibers are in a substantially fluid tight relationship with the partition. The partition can be adapted to enable fluid flow to the adjacent subsequent zone, and thus provide the means for fluid communication between zones. For instance, the fluid flow may be through perforations, or holes, in the partition, or the partition may be positioned in the shell such that fluid can pass between the partition and the inner wall of the shell. These fluid flow passages communicating between the zones are desirably positioned such that substantially all of the fluid flow on the exterior of the hollow fibers in a zone is primarily transverse to the orientation of the hollow fibers. For example, if the fluid ingress means comprises a multiply perforated tube positioned substantially longitudinally at approximately the axis of the bundle and the bundle has a generally circular cross-sectional configuration, an annular space may be provided between the hollow fibers and the inside wall of the shell, and the partition may be positioned away from the interior wall of the shell at this annular space or have multiple openings at this annular space to enable fluid flow into the subsequent zone. On the other hand, the fluid ingress means may comprise a fluid ingress port in the shell. If the cross-sectional configuration of the bundle is generally circular, preferably a multiply perforated tube extends through the partition and into the hollow fiber bundle at approximately its longitudinal axis. This multiply perforated tube is adapted to receive the fluid passing on the shell side of the hollow fibers in the initial zone for passage through the partition and into the subsequent zone. Advantageously, this multiply perforated tube extends into the hollow fiber bundle in the subsequent zone substantially along the approximate longitudinal axis of the bundle and serves as the fluid ingress means for that zone. If the hollow fiber bundle is, say, rectangular in cross-section, and the fluid ingress port can be positioned in one wall, then the transverse flow of the fluid through the bundle may be effected by providing fluid flow openings on the portion of the partition opposite the side of the fluid ingress port or by a partition which does not extend to the wall of the shell opposite the fluid ingress port. The bundle of hollow fibers, however, should intimately contact the interior side walls of the shell or other means provided such that the flow of fluid is essentially through the bundle of hollow fibers and does not bypass the bundle around its edges to any significant extent. Although a conduit can be provided which communicates between zones by extending through the wall of the shell in each zone, this means is often less desirable due to fabrication costs. Preferably, each of the subsequent zones in the permeator have means including means, such as described above, for providing transverse fluid flow across the hollow fiber bundle.

The partition may be prepared in any suitable manner, and often techniques such as employed in fabricating tube sheets are convenient. One technique which may find application is similar to the procedures such as disclosed in U.S. Pat. Nos. 3,455,460 (Mahon) and 3,690,465 (McGinnis, et al.), both of which are incorporated by reference. These procedures involve depositing or impregnating the ends of the hollow fibers with potting material while assembling the hollow fibers into a bundle. Thus, these procedures could be modified by also concurrently depositing the potting material at the positions desired for the partitions while assembling the hollow fibers into a bundle. In another procedure, a partition can be formed in a fabricated bundle. In one procedure, a dam of a material, e.g., wax, polymer including gels, a liquid of higher density and immiscible with the potting material, is prepared in the hollow fiber bundle immediately below the desired position of the partition and then a settable potting material is cast on top of the dam to form the partition. The dam can be of a readily removable material and can be removed subsequent to the solidification of the potting material. Techniques similar to those employed in fabricating dams can be used to fabricate the partitions. Examples of these techniques can be found in my U.S. Pat. Nos. 3,730,959 and 3,734,989.

The permeator can be a double open-ended permeator, that is, each end of the shell is adapted to receive a tube sheet such that fluid can exit the bores of the hollow fibers at each end or be passed from one end to the other end of the hollow fibers through the bores. In an example of an operation of a double open-ended permeator, the fluid feed mixture can be introduced to the shell side of the permeator, i.e., contacts the exterior surface of the hollow fibers, and a reactant or a sweep fluid can be passed through the bores of the hollow fibers in order to enhance the driving force for the permeating fluid. Alternatively, the fluid feed mixture can be fed to the bores of the hollow fibers with a reactant or a sweep fluid being passed on the shell side of the permeator. Another type of permeator which can be employed is a single open-ended permeator, that is, only one end of the shell is open and adapted to receive a tube sheet. The hollow fibers can be in "U" shape with both ends embedded in the tube sheet or one end of each of the hollow fibers can be embedded in the tube sheet with the other end of the hollow fibers being plugged in a fluid impervious manner, e.g., by being embedded or encased, in a solid, substantially fluid impervious, material. When the hollow fibers are in a "U" shape with both ends extending through a tube sheet, it is possible to pass a reactant or a sweep fluid, or the fluid mixture through the hollow fibers by segmenting the tube sheet and arranging the hollow fibers such that one portion of the tube sheet communicates with the remaining portion of the tube sheet only through the bores of the hollow fiber.

IN THE DRAWINGS

Figure 1:
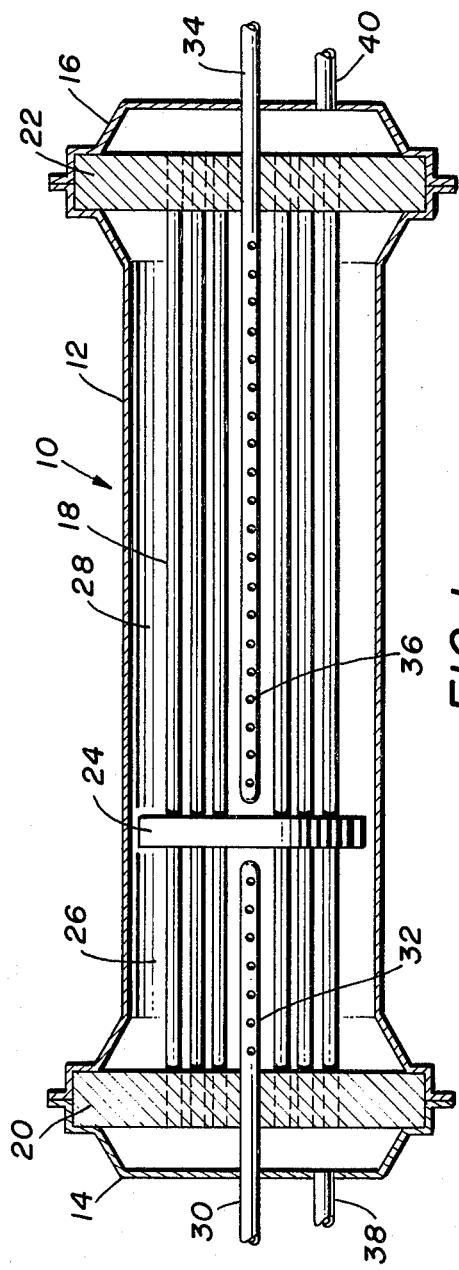
FIG. 1 is a schematic, longitudinal cross-sectional representation of a hollow fiber permeator having a circular transverse cross-section containing a partition defining two zones containing different membrane surface areas in accordance with this invention.

With respect to FIG. 1, the permeator is generally designated by numeral 10 and comprises tubular shell 12 which is open at each end. End cap 14 and end cap 16 are provided on shell 12 to close the open ends. The shell and end caps may be comprised of any suitable, fluid impervious material such as metals and plastics.

Bundle 18 which is comprised of a plurality of hollow fibers is positioned within shell 12. Often the bundle comprises over 10,000 hollow fibers, and frequently there may be in excess of 1,000,000 fibers. Advantageously, the bundle has essentially the same cross-sectional configuration as that of the shell but with a smaller diameter than the inside diameter of shell 12 such that fluid flow channels exist at the periphery of the bundle. Each end of each of the hollow fibers is embedded in a tube sheet such that the bores of the hollow fibers communicate through the tube sheet. As depicted, one end of the hollow fibers is embedded in tube sheet 20, and the other end is embedded in tube sheet 22. Tube sheet 20 is mounted in a fluid tight relationship with shell 12 by end cap 14 by being positioned between shell 12 and end cap 14. "O"-rings or similar devices may be employed to ensure achieving the desired fluid tight relationship. Tube sheet 22 is mounted at the other end of shell 12 in a similar manner. Tube sheets 20 and 22 may be formed in any suitable manner, e.g., by forming a removable dam which retains potting material to form the tube sheet such as disclosed in U.S. Pat. Nos. 3,730,959 and 3,734,989 (Leonard); by casting a potting material around the end of the bundle such as disclosed in U.S. Pat. Nos. 3,339,341 (Maxwell, et al.) and 3,442,389 (McLain) or by impregnating the ends of the fibers with potting material while assembling the hollow fibers to form the bundle such as disclosed in U.S. Pat. Nos. 3,455,460 (Mahon) and 3,690,465 (McGinnis, et al.) all of which patents are incorporated by reference. Suitable potting materials include settable liquid polymeric compositions (such as epoxies, urethanes, etc.) solders, cements, waxes, and the like.

Encompassing hollow fiber bundle 18 and intermediate tube sheets 20 and 22 is partition 24. Partition 24 forms initial zone 26 and second zone 28 and is located such that the membrane surface area in the initial zone 26 is approximately 25 percent of the total available membrane surface area in the permeator. Partition 24 is formed by an essentially fluid impermeable material such as any of the materials which may be employed in fabricating the tube sheets. The bores of the hollow fibers communicate through partition 24. As shown, partition 24 encompasses the diameter of the bundle but has a smaller diameter than the inside diameter of shell 12 in order to provide fluid flow channels between zones 26 and 28 defined by the partition. Alternatively, partition 24 may extend to the inside wall of shell 12 and have fluid passages, e.g., bores, positioned at its peripheral region. In another alternative, spacers may be employed to maintain partition 24 in the desired spaced-apart relationship with shell 12.

Feed tube 30 extends in a fluid tight relationship through end cap 14 and seal 20 into bundle 18 in zone 26. Multiple perforations 32 are provided at the length of feed tube 30 which extends into zone 26 in order to distribute fluid in the bundle. Desirably, feed tube 30 is positioned approximately in the cross-sectional center of bundle 18 such that the fluid flow radially outward from feed tube 30 is substantially equal in each radial sector of the bundle. Exit tube 34 having multiple perforations 36 is similarly positioned in bundle 18 except that it extends through end cap 16 and seal 22 into zone 28.

End cap 14 is provided with port 38 which is in communication with the bores of the hollow fibers. Likewise, end cap 16 is provided with port 40 which is in communication with the bores of the hollow fibers.

In an advantageous mode of operation of the permeator a fluid feed mixture containing at least one fluid to be selectively permeated through the hollow membrane fibers is inroduced into zone 26 via feed tube 30. The fluid feed mixture radially flows outward among the hollow fibers and into the peripheral zone surrounding the hollow fiber bundle. During this passage through the bundle, permeation of the at least one fluid through the walls of the hollow fibers occurs. The fluid feed mixture then passes in the peripheral zone around partition 24 to the peripheral zone surrounding the hollow fiber bundle in zone 28. The fluid feed mixture radially flows inward and enters exit tube 34 via perforations 36. Additional permeation of the at least one fluid occurs through the walls of the hollow fibers as the fluid feed mixture flows in the hollow fiber bundle to exit tube 34. The fluid feed mixture entering exit tube 34 leaves the permeator. A sweep fluid, or reactant in the case of reactive dialysis, enters either port 38 or 40 and passes into and through the bores of the hollow fibers and exits the permeator through the port in the opposite end cap.

The permeator of FIG. 1 can be employed, for example, in a reactive dialysis operation to remove phenol from an aqueous solution of phenol. For instance, an aqueous phenol solution containing about 2 weight percent phenol enters permeator 10 via feed tube 30. An aqueous sodium hydroxide solution containing, say, about 12 weight percent sodium hydroxide, and being at a slightly elevated temperature, e.g., about 60° C., when fed to the permeator, is passed through the bores of the hollow fibers. A useful membrane material for forming the hollow fibers for this separation operation is an ethylene/vinyl acetate copolymer. Sufficient sodium hydroxide solution is employed to ensure that substantially all of the permeating phenol is reacted to the essentially nonpermeating sodium phenate. The flow of the sodium hydroxide solution to the bores of the hollow fibers is substantially uniform. When the shell-side effluent from the permeator, i.e., the fluid exiting the permeator via line 34, contains about 100 parts per million by weight (ppmw) of phenol, approximately 75 percent of phenol permeates through the membrane surface area in initial zone 26. Thus, the hollow fibers at the periphery of the bundle in zone 26 (and at the periphery of the bundle in zone 28) are exposed to a phenol concentration of about 5000 ppmw. On the other hand, if no partition were employed, these hollow fibers at the periphery of the bundle would only be exposed to a phenol concentration of about 100 ppmw. If one partition were employed to divide the permeator into equal zones, the phenol concentration at the periphery of the bundle would be about 1400 ppmw. Thus, in accordance with this invention, a substantial amount of the phenol can permeate through the hollow fibers at the periphery of the bundle such that the phenol permeation through the hollow fibers is more uniform.

Generally, as the difference in chemical potential of the at least one fluid in the feed stream between entering and exiting the permeator increases, it is desired to utilize a permeator in accordance with this invention in which the available membrane surface area in the initial zone is increasingly smaller in proportion to the total available membrane surface area in the permeator. The foregoing example illustrates a 200-fold reduction in phenol, and the size of the initial zone is theoretically optimized at about 25 percent of the total required membrane surface area to effect the reduction. If, say, a 2000-fold reduction is desired, e.g., from 20,000 to 10 ppmw phenol, the size of the initial zone is theoretically optimized at about 20 percent of the total required membrane surface area. Under these theoretical optimum conditions, the total flux of the permeating at least one fluid in the initial zone is decreased with increasing reductions of the at least one fluid between entering and exiting the permeator.

Figure 2:
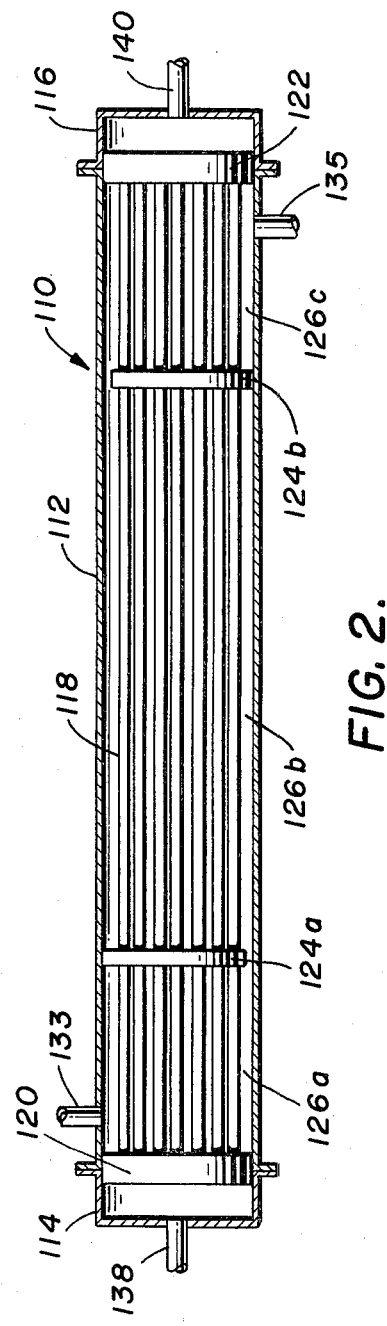
FIG. 2 is a schematic, longitudinal cross-sectional representation of a hollow fiber permeator having a rectangular transverse cross-section containing two partition defining three symmetrical zones in which the middle zone contains a greater membrane surface area than the end zones in accordance with this invention.

Permeator 110 depicted in FIG. 2 comprises elongated shell 112 having a rectangular transverse cross-sectional configuration and is adapted to receive a tube sheet at each end. End cap 114 and end cap 116 close the ends of shell 112. Bundle 118 composed of a plurality of hollow fibers is positioned in shell 112. Bundle 118 extends across the width of shell 112 such that substantially all of the fluid passing from, e.g., the top to the bottom of the bundle, passes among the hollow fibers. As shown, fluid flow channels exist in the regions between the top of the bundle and the inside wall of the top of shell 112 and in the region between the bottom of the bundle and the inside wall of the bottom of shell 112. Each end of the bundle is embedded in a tube sheet which is in a fluid tight relationship with shell 112. Tube sheet 120 is positioned between end cap 114 and shell 112, and tube sheet 122 is positioned between end cap 116 and shell 112.

Partitions 124a and 124b are positioned between tube sheets 120 and 122 and define zones 126a, 126b, and 126c of the permeator. As shown in FIG. 2, partition 124a extends in an essentially fluid tight relationship from the top and sides of shell 112 to below the bottom of bundle 118 with fluid flow channels being provided between the bottom of the partition and the bottom wall of shell 112. Partition 124b extends in an essentially fluid tight relationship from the bottom and sides of shell 112 to above the top of bundle 118 with fluid flow channels being provided between the top of the partitions and the top wall of shell 112. Thus, fluid flow between the zones separated by the partitions occurs essentially only in these flow channels between the partitions and either the top or bottom wall of the shell. As depicted, the permeator is symmetrical with initial zone 126a and zone 126c containing approximately the same membrane surface area, e.g., each zone has about 25 percent of the total available membrane surface area in the permeator, with zone 126b containing about 50 percent of the total available membrane surface area in the permeator.

Entry port 133 is illustrated as being positioned on the top of shell 112 for fluid communication into zone 126a. Exit port 135 is located at the bottom of shell 112 for fluid communication from zone 126c. Thus, the fluid flow pattern on the shell side of the hollow fibers involves a generally downward flow among the hollow fibers in zone 126a, a generally upward flow in zone 126b, and a generally downward flow in zone 126c. Since the permeator is symmetrical, the feed pattern to the permeator can be reversed without a deleterious effect.

End cap 114 is provided with port 138 and end cap 116 is provided with port 140 to provide for fluid communication with the bores of the hollow fibers.

While permeator 110 is depicted as being horizontally oriented with port 133 positioned in the top wall of the shell it is clear that alternative orientations may be advantageously employed.

Utilizing the permeator of FIG. 2 in a reactive dialysis operation such as is described in connection with FIG. 1 to reduce, e.g., a 2 weight percent phenol solution to an aqueous solution containing about 100 parts per million by weight of phenol, the amount of phenol permeating through the hollow fibers at the top of the bundle is approximately the same as the amount permeating through the hollow fibers at the bottom of the bundle. If, however, the baffles were equally spaced, nearly eight times the amount of phenol would be expected to permeate through the top hollow fibers of the bundle than the amount through the hollow fibers at the bottom of the bundle, and thus eight times the amount of sodium hydroxide would be required in the hollow fibers at the top of the bundle.

The hollow fiber bundles utilized in accordance with this invention can be any suitable configuration. Desirably, the bundle has sufficient thickness, i.e., layers of hollow fibers, to provide, in combination with the length of the hollow fibers in a zone, desirable amounts of permeation in a zone. Often the thickness through which the fluid travels in the bundle is at least about 0.02 to 0.05 meter, preferably at least about 0.1 meter, say, up to about 1 or 2 or more meters. Preferably the hollow fibers are distributed such that the bundle is essentially free from flow channels which enable significant amounts of the fluid to bypass contact with the hollow fibers, i.e., the density of hollow fibers per unit of cross-sectional area of the bundle is substantially uniform. The effective length of the hollow fibers in each zone of the permeator may also vary widely, for instance, from about 0.1 to 5 or more meters, say, about 0.2 to 2 or 3 meters. The packing factor of the hollow fibers in the bundle, i.e., the percent of the cross-sectional area of the bundle actually occupied by the hollow fibers including the bores, is frequently at least about 35 percent, preferably at least about 45, say, about 45 to 65, often about 47 to 55 or 60, percent.

Hollow fiber diameters may be selected over a wide range, however, the hollow fiber should have sufficient wall thickness to provide adequate strength to the hollow fiber. Frequently, the outside diameter of the hollow fibers is at least about 30, say, at least about 50, microns, and the same or different outside diameter fibers may be contained in a bundle. Often, the outside diameters are less than about 1000 microns. Although larger outside diameter hollow fibers can be employed, they are less preferred due to the low ratios of hollow fiber surface area per unit volume of fluid separation apparatus which are provided. Preferably, the outside diameter of the hollow fibers is about 100 to 1000, say, about 150 or 350 to 800 microns. In some instances larger diameter hollow fibers (e.g., at least about 350 microns in diameter) are desired due to the enhanced dispersion of fluid among the hollow fibers in the bundle which can often be obtained. Frequently, the wall thickness of the hollow fibers is at least about 5 microns, and in some hollow fibers, the wall thicknesses may be up to about 200 or 300 microns, say, about 50 to 200 microns.

In order to provide desirable fluxes through the hollow fibers, particularly using those hollow fibers having walls at least about 50 microns in thickness, the hollow fibers may have a substantial void volume, Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions, of the walls of the hollow fibers. The density of the hollow fiber can be essentially the same throughout its wall thickness, i.e., isotropic, or the hollow fiber can be characterized by having at least one relatively dense region within its wall thickness in barrier relationship to fluid flow through the wall of the hollow fiber, i.e., the hollow fiber is anisotropic. Generally, a relatively dense region of anisotropic hollow fibers is at substantially at least one of the exterior and interior of the hollow fiber.

Particularly advantageous hollow fibers are hollow fibers having low amplitudes waves, or crimps, such as disclosed by me in my copending U.S. patent application Ser. No. 855,850, filed Nov. 30, 1977, herein incorporated by reference. The amplitude of the crimps as referred to herein is one-half the lateral distance between the midpoint of the hollow fiber at one apex to the midpoint of the hollow fiber at the next adjacent, diametrically-opposed apex. When no adjacent, diametrically-opposed apex exists, the amplitude is the lateral distance between the midpoint of the hollow fiber at the apex to the midpoint of the hollow fiber which is not crimped. Advantageously, the amplitude of the crimps is less than about 50 percent of the diameter of the hollow fiber, and generally, the amplitudes of the crimps are within the range of about 1 to 30 percent of the diameter of the hollow fiber. Fiber crimp amplitudes of above about 50 percent of the diameter can also be employed. Each of the crimps in a hollow fiber or among the hollow fibers employed to form the bundle may have the same or different amplitude than other crimps, and the amplitudes of the crimps may vary over a range to assist in breaking any register between hollow fibers. Moreover, the bundle may contain hollow fibers having substantially no crimps, which fibers are interspersed with hollow fibers having crimps. The crimps need not be continuous over the length of a hollow fiber. Thus, the crimps may be intermittently spaced over the length of the hollow fiber, and the frequency of the crimps may be irregular. Moreover, as stated above, fibers with a distribution of crimp frequency can be employed. Generally, at least about 50 percent, preferably at least about 75 percent, of the fibers in a bundle are crimped. The hollow fibers which are crimped frequently have an average of at least one crimp per each five centimeters of fiber length. The average frequency of crimps over the length of a hollow fiber is often about 0.2 to 10 or more, say, about 0.25 to 5, percent. If the frequency of the crimps in the hollow fiber is irregular, the crimps generally range in frequency from about 1 to about 50 crimps per five centimeters, e.g., from about 1 to about 30 crimps per five centimeters, of hollow fiber length. The period of the crimps, i.e., the length of each crimp, is desirably sufficiently short that the crimp maintains its configuration, and substantial changes in amplitudes of the crimp do not occur when the hollow fibers are assembled into a bundle. For instance, if the period of the crimp is too long and gradually ascends to its apex, then even minor mechanical forces may tend to straighten out the hollow fiber. In order to obtain the advantages provided by this invention, the period of the crimp can be relatively short, e.g., less than about 5 centimeters. The shortness of the crimps is generally limited by the dimensions of the hollow fiber, i.e., with smaller diameter hollow fibers generally smaller crimp periods can be obtained. Frequently, the average crimp period is about 0.05 to 5, e.g., about 0.1 to 2, centimeters. The ratio of the average crimp period to the average frequency of crimps may vary widely, for instance, from about 0.05:1 to 1:1, often about 0.1:1 to 1:1. In assembling bundles containing this crimped hollow fiber, it is desired that the crimps in the hollow fibers do not fall in register. Advantageously, at least some of the hollow fibers vary in at least one of crimp frequencies, crimp period, and crimp amplitudes such that with a random assembly of the hollow fibers, the probability of obtaining an undue amount of fibers in register is minimal.

The hollow fibers may be fabricated from any suitable synthetic or natural material suitable for fluid separations or as supports for materials which effect the fluid separations. The selection of the material for the hollow fiber may be based on the heat resistance, chemical resistance, and/or mechanical strength of the hollow fiber as well as other factors dictated by the intended fluid separation in which it will be used and the operating conditions to which it will be subjected. Thus, the material for forming the hollow fibers may be inorganic, organic or mixed inorganic and organic. Typical inorganic materials include glasses, ceramics, cermets, metals and the like. The organic materials are usually polymers. In the case of polymers, both addition and condensation polymers which can be fabricated in any suitable manner to provide hollow fibers are included. Generally organic and sometimes organic polymers mixed with inorganics (e.g., fillers) are used to prepare the hollow fibers. Typical polymers can be substituted or unsubstituted polymers and may be selected from polysulfones; poly (styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate, cellulose-acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly (ester-amide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly (propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly (vinyl pyridines), poly(vinyl pyrrolidones), poly(vinyl ethers), poly(vinyl ketones), poly(vinyl aldehydes) such as poly(vinyl formal) and poly(vinyl butyral), poly (vinyl amides), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; polyacetals; etc., and interpolymers, including block terpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

It is claimed:

1. A permeator for separating by the selective permeation of at least one fluid from a fluid mixture containing at least one other fluid comprising an elongated, fluid impermeable shell having at least one end adapted to receive a tube sheet; a plurality of selectively permeable hollow fibers, said hollow fibers having an exterior surface and a bore and said hollow fibers being generally parallelly positioned within the shell to form an elongated bundle of hollow fibers; at least one tube sheet, said tube sheet being in fluid tight relationship with the shell wherein at least one end of each of said hollow fibers is embedded in a fluid tight relationship in said at least one tube sheet and wherein the bores of said hollow fibers communicate through said tube sheet; at least one essentially fluid impermeable partition in said shell transverse to the longitudinal orientation of the hollow fibers to provide zones in said shell, there being provided an initial zone and at least one subsequent zone; means to enable fluid flow between adjacent zones wherein said means and said partition are adapted to provide the fluid flow in each of said zones which is primarily transverse to the orientation of the hollow fibers in the zone; fluid ingress means adapted to provide fluid flow into said shell to the exterior of said hollow fibers in said initial zone; longitudinally distant fluid egress means adapted to provide fluid flow from the exterior of said hollow fibers out of said sheel from a subsequent zone wherein said initial zone is significantly smaller in available membrane surface area to effect said fluid separation than the available membrane surface area in an at least one subsequent zone.

2. The permeator of claim 1 in which the initial zone contains less than about 90 percent of the available membrane surface area which is contained in an at least one subsequent zone.

3. The permeator of claim 2 in which the bore side of the hollow fibers is the permeate side.

4. The permeator of claim 2 in which the initial zone contains less than about 40 percent of the total available membrane surface area in the permeator.

5. The permeator of claim 2 in which the ratio of available membrane surface area in the zone immediately adjacent the initial zone to the available membrane surface area in the initial zone is at least about 1.1:1.

6. The permeator of claim 2, 4 or 5 in which the initial zone contains at least about 10 percent of the total available membrane surface area in the permeator.

7. The permeator of claim 2, 4 or 5 in which sufficient membrane surface area is provided to effect at least a five-fold reduction in the chemical potential of the at least one fluid in the fluid mixture.

8. The permeator of claim 2 in which each of the shell and bundle has a generally circular transverse cross-sectional configuration and an annular space is provided between the bundle and the shell.

9. The permeator of claim 8 in which a multiply perforated tube is positioned substantially longitudinally at the axis of the bundle.

10. The permeator of claim 9 in which the fluid ingress means comprises at least one port in the shell communicating with the initial zone, the multiply perforated tube communicates through said partition providing said initial zone, and said partition providing said initial zone is in a substantially fluid tight relationship with said shell.

11. The permeator of claim 9 in which the fluid ingress means comprises said multiply perforated tube which communicates with the initial zone and said partition providing said initial zone has fluid flow channels communicating with said annular space between said bundle and shell to provide fluid flow between the zones defined by partition.

12. The permeator of claim 2 in which each of the shell and bundle have a generally rectangular cross-sectional configuration and the bundle extends across the width of the shell.

13. The permeator of claim 1, 8 or 12 in which the shell is adapted to receive a tube sheet at each end.

14. The permeator of claim 1, 2 or 4 containing up to about 5 zones.

15. The permeator of claim 1, 2 or 4 containing at least three stages in which the stages are symmetrical.

* * * * *

UNITED STATES PATENT AND TRADEMARK OFFICE
CERTIFICATE OF CORRECTION

PATENT NO. : 4,220,535
DATED : September 2, 1980
INVENTOR(S) : Richard L. Leonard It is certified that error appears in the above-identified patent and that said Letters Patent are hereby corrected as shown below:

Column 1, line 23, after "solid" insert -- ) --.

Column 1, line 26, "liquifaction" should read -- liquefaction --.

Column 1, line 52, "blool" should read -- blood --.

Column 5, line 34, "times," should read -- , times --.

Column 5, line 40, "1:1:1" should read -- 1.1:1 --.

Column 9, line 36, "McLain" should read -- Mendelson --.

Column 12, line 31, "to" should read -- or --.

Column 15, line 40, "sheel" should read -- shell --.

Signed and Sealed this

Sixth Day of January 1981

[SEAL]

Attest:

SIDNEY A. DIAMOND

Attesting Officer

Commissioner of Patents and Trademarks